Aug. 28, 1934.   J. W. McCLURE ET AL   1,971,866
ROTARY DIVIDER FOR GRAIN HARVESTING MACHINES
Filed April 4, 1934   5 Sheets-Sheet 1
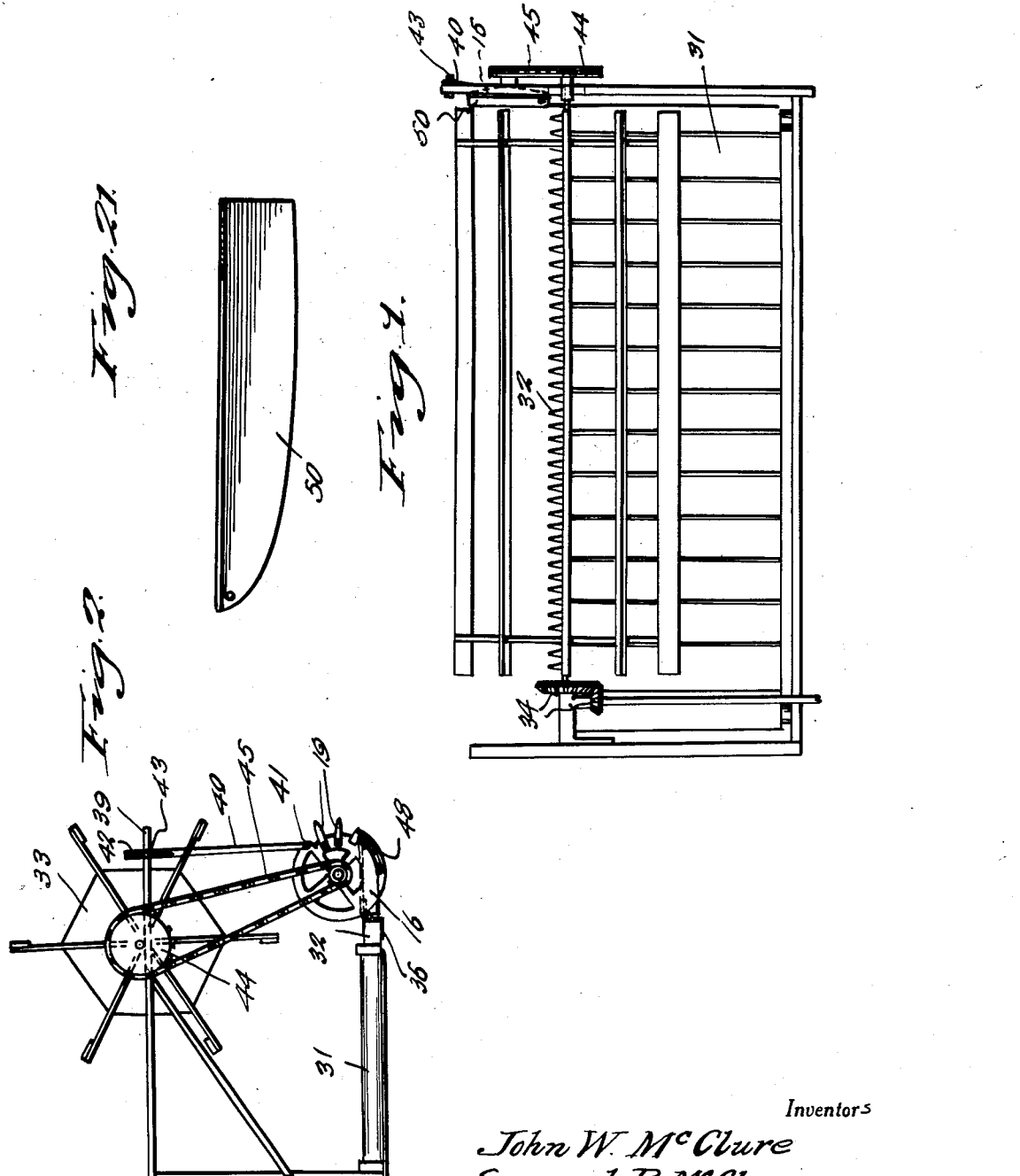
Inventors
John W. McClure
Samuel B. McClure
By *Clarence A. O'Brien*
Attorney

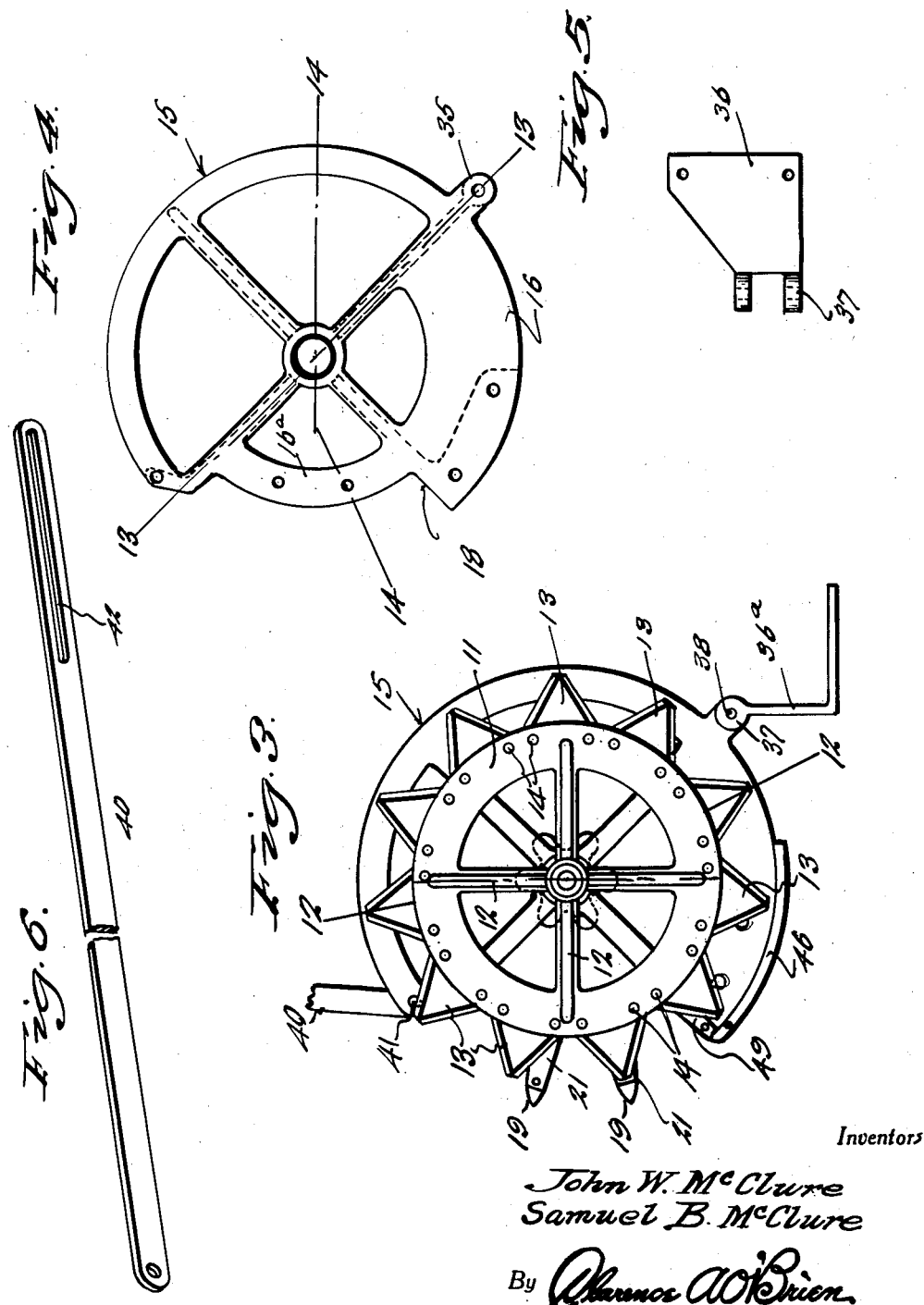

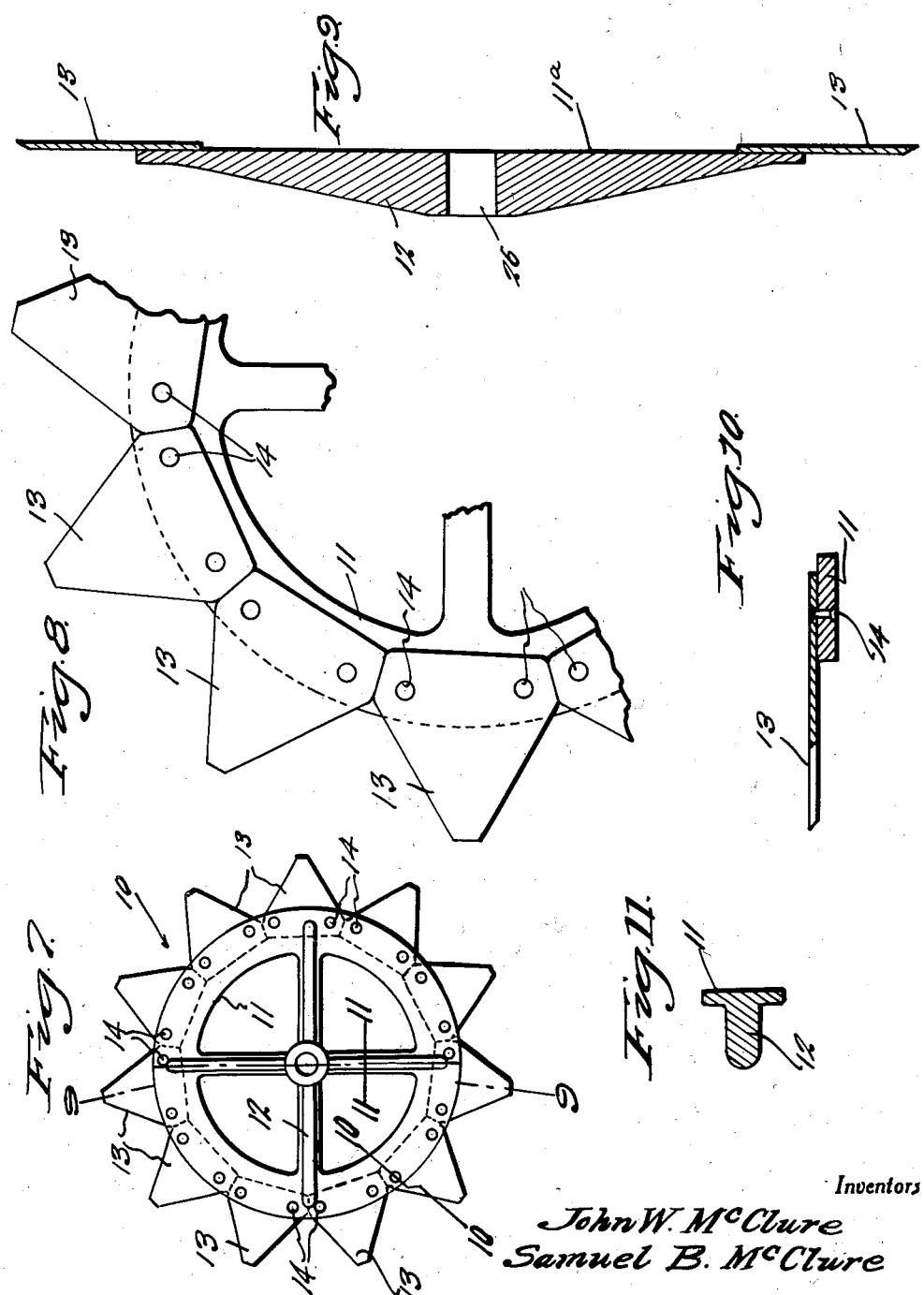

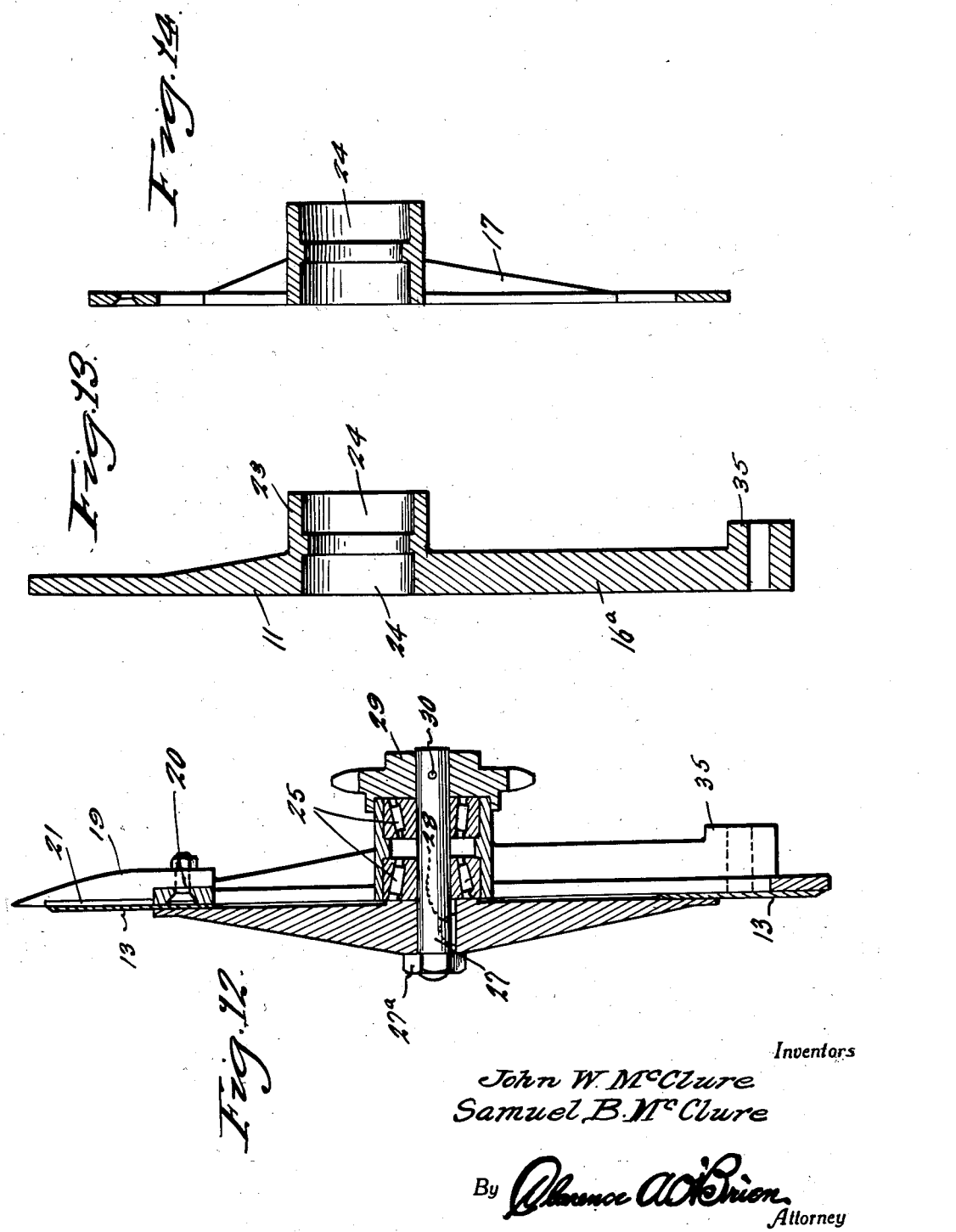

Aug. 28, 1934.   J. W. McCLURE ET AL   1,971,866
ROTARY DIVIDER FOR GRAIN HARVESTING MACHINES
Filed April 4, 1934   5 Sheets-Sheet 5
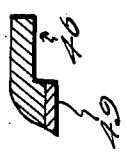
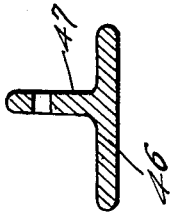
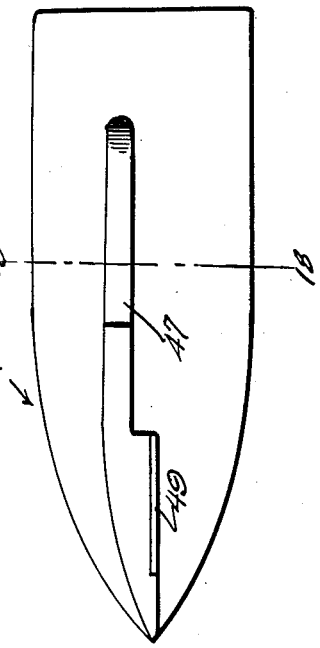
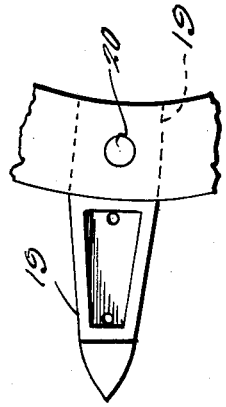
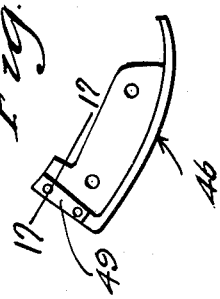
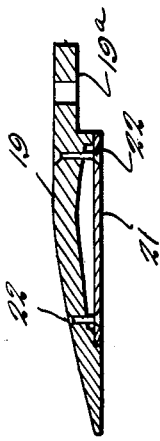
Inventors
John W. McClure
Samuel B. McClure
By Clarence A. O'Brien
Attorney Patented Aug. 28, 1934

1,971,866

UNITED STATES PATENT OFFICE

1,971,866

ROTARY DIVIDER FOR GRAIN HARVESTING MACHINES

John William McClure and Samuel B. McClure, Assumption, Ill.

Application April 4, 1934, Serial No. 719,020

6 Claims. (Cl. 56—315)

This invention is a rotary divider for use, primarily, at the outer end of the platform of a combine or binder; and the purpose of the device is to cut through the leaning and tangled grain and weeds, so as to prevent "choking" of the sickle, and "slugging" of the cylinder of the machine.

Among the objects of the invention is the provision of a device of this character that will perform more satisfactorily, save grain, can be used over a longer period of time, and will be free of vibration and numerous defects now prevalent among the types of dividers generally used at the present time.

It is also an object of the present invention to provide a rotating divider than can be used on all grain harvesting machines, such as mowers, binders and combines; and which also can be driven from suitable and various sources of power such as the reel or land wheel of the machine or through the medium of special shaftings.

The invention as well as its objects and advantages can be best understood from a study of the following description taken in connection with the accompanying drawings wherein:

Figure 1 is a top plan view of a combine illustrating the application of our invention thereto.

Figure 2 is an end elevation showing the manner of driving the divider from the reel of the combine, as well as the manner for supporting the divider in position on the machine.

Figure 3 is a side elevational view of the divider.

Figure 4 is an elevational view of the stationary part of the divider.

Figure 5 is a plan view of an attaching bracket.

Figure 6 is a perspective view of a suspension link.

Figure 7 is an elevational view of the rotary or cutter disk.

Figure 8 is an enlarged fragmentary elevational view of the disk, showing the manner of securing the cutting knives thereto.

Figures 9, 10 and 11 are sectional views taken substantially on the lines 9—9, 10—10, and 11—11 respectively of Figure 7.

Figure 12 is a sectional view taken substantially on the line 12—12 of Figure 3.

Figures 13 and 14 are sectional views taken substantially on the lines 13—13 and 14—14 respectively of Figure 4.

Figure 15 is a side elevational view of a shoe.

Figure 16 is a fragmentary elevational view of a part of the stationary disk provided with a guard finger.

Figure 17 is a sectional view taken substantially on the line 17—17 of Figure 15.

Figure 18 is a sectional view taken substantially on the line 18—18 of Figure 20.

Figure 19 is a longitudinal sectional view through a guard finger showing the ledger plate in position thereon, Figure 20 is a top plan view of the shoe, and Figure 21 is a plan view of a grain slide.

In the preferred construction thereof the rotary divider consists of a rotating part indicated generally by the reference numeral 10. This part 10, as best shown in Figures 7 to 11 inclusive comprises a circular plate or disk, of spider-like form, and indicated by the reference numeral 11. The webs of the plate are preferably provided on one face thereof with strengthening ribs 12. The plate 11 carries a circular series of cutting knives 13, and these knives are very similar to knives now commonly used on mowers. The knives 13 are secured to the disk 11 by rivets or other suitable fastening devices 14.

The divider comprises a second or stationary part indicated by the reference numeral 15. The member or part 15 comprises a circular plate or disk 16 which is of materially greater diameter than the disk of the member 10 so as to project slightly beyond the ends of the knives 13 as will be clear from a study of Figure 3. The member 16 is also somewhat of spider form or construction, and has the webs thereof reinforced by ribs 17. The plate 16 is also provided in its periphery with a notch 18 and projecting from the notch portion of the plate are circumferentially spaced guard fingers 19, the shanks 19a of which are bolted to a part 16a of the plate, or are otherwise secured to said part of the plate as at 20. The guard fingers 19 are somewhat similar in construction to the guard fingers employed in mower construction, and each guard finger, there being in the present instance two guard fingers, is provided with a ledger plate 21 secured in position in any suitable manner, as by rivets or other suitable fastening devices 22. As shown in Figures 13 and 14, the member 15 has the plate 16 thereof provided with a hub 23 having internal recesses 24—24 in which are fitted suitable bearings 25.

In assembling the parts 10 and 15 of the divider said parts are disposed with their respective faces 11a and 16a respectively confronting and as will be clear from a study of Figure 12. At its center the plate 11 of member 10 is provided with an opening 26 that is disposed concentric to the hub 23, and a pin 27 is passed through the opening 26 and the hub 23 being accommodated by the bearings 25 as also shown in Figure 12. The plate 11 of member 10 is splined or keyed to the pin 27 as at 28 to rotate with the pin, and the parts 10 and 15 are confined on the pin between the head 27a of the pin and a sprocket 29 secured as at 30 to the end of the pin 27 opposite to the head 27a. In the present instance the head 27a is shown in the form of a nut screwed on to one end of the pin. It will thus be seen that the member 10 will rotate relative to the fixed member 15 so that the knives 13 will pass over the guard fingers 19 in a manner to produce an effective cutting action.

In Figures 1 and 2 there is shown the device, constructed as above described mounted on a combine, which includes among other parts such parts as are illustrated in the drawings, as for example the platform 31 which receives the cut grain from the sickle 32; and the reel 33, which in this instance and as is more or less conventional, is mounted directly above the sickle bar and is driven from any suitable driving means through the medium of gearing 34.

As shown in Figures 1 and 2 when the divider is mounted on the combine the part 15 thereof is disposed outermost; and said part at a proper point in its circumference is provided with an apertured ear or lug 35 and a substantially L-shaped bracket 36 has a vertical part 36a terminating in a pair of spaced ears 37 that receives between them the ear 35 and through the medium of which and a pin 38 the bracket 36 is pivoted to the part 15 of the divider. The body or horizontal part of the bracket 36 is secured by suitable fastening devices to the under side of the sickle bar 32 immediately adjacent one end thereof as will be clear from Figures 1 and 2.

The part 15 of the divider is suspended from the frame 39 of the combine through the medium of a link 40. The link 40 at one end is pivoted as at 41 to the plate 16 of the member 15 at a point on the plate diametrically opposite to the lug or ear 35. The upper end of the link 40 is provided with a slot 42 to receive a bolt 43 carried by the frame member 39, and thus, as is obvious, means is provided for suspending the divider in a manner to vary the elevation thereof with respect to the ground.

In the present instance the divider is shown as being driven from the reel 38, and to that end there is provided on the shaft of the reel 33 at one end thereof a sprocket 44 and trained over sprocket 44 and the aforementioned sprocket 29 is a chain 45.

It will thus be seen that in actual practice and during rotation of the reel 33 the rotating part 10 of the divider will be caused to revolve, and by the cooperating action of the knives 13 and the ledger plate-equipped guard fingers 19 leaning and tangled grain and weeds encountered by the divider will, in an efficient and effective manner be cut, with the result that the sickle will be kept free when encountering such grain and weeds, and consequently the sickle will not be liable to a "choking" thereof. Thus a combine or other harvesting machine equipped with a divider embodying the features of the present invention will not have its efficiency impaired upon encountering fallen and tangled grain and weeds. To protect the knives 13 and to prevent contact thereof with the ground there is mounted on the plate 16 of the fixed member 15 a combined ground slide and shoe 46. The shoe 46 is longitudinally curved and tapers to a point at its front end where the curvature becomes more pronounced as will be clear from a study of Figures 16 and 20. At one side of its longitudinal median the shoe 46 is provided with an upstanding web 47 that is suitably apertured to accommodate fastening means 48 whereby the shoe is secured to the plate 16 of the member 15 and in a manner to extend from the lower end of the notch 18 rearwardly along the peripheral edge of the disk 16 and in the direction of the platform 31. The web at the forward end of the shoe has secured thereto a ledger plate 49 which cooperates with the knives 13 in cutting tangled grain.

For use with the divider there is also provided a grain slide shown in Figure 21 and indicated generally by the reference numeral 50. The slide 50 may or may not be used as found desirable and is secured at the inner side of the divider as suggested in Figure 1; and this slide extends back toward the bracket 36 and is disposed substantially coplanar with the top of the sickle bar of the machine. The slide 50 will not be used nor will it be required on all makes of mowing machines and may be dispensed with whenever found desirable either because of lack of necessity or lack of adaptability to the particular harvesting machine.

Having thus described our invention, what we claim as new is:

1. A rotary divider for use with harvesting machines, and comprising vertical, juxta-positioned relatively fixed and rotatable parts, said fixed part having laterally secured thereto a short series of guard fingers projecting radially beyond the edge thereof, a pin extending through the central portion of the fixed part, said rotatable part being secured to the pin and rotatable therewith relative to the fixed part, a continuous circular series of cutting knives on the rotatable part movable transversely across the guard fingers and cooperable therewith for cutting purposes, driving means connected with the pin for rotating said rotatable part, and a guard shoe secured to the fixed part and extending laterally thereof concentric to the rotatable part and arranged in a protective position relative to the knives.

2. In a harvesting machine, and in combination, a sickle, a reel, a divider having a vertical relatively fixed part, an attaching bracket pivoted to said fixed part and secured to the sickle bar at one end of the latter, a suspension link pivoted to the fixed part at a point diametrically opposite to the bracket, said suspension link having means at its free end for adjustable connection with a frame part of the harvesting machine for cooperation with the bracket in supporting the divider perpendicularly, said fixed part being also provided with a hub equipped with internal bearings, a pin extending through the hub and journalled in the bearings, a rotating part secured on one end of the pin to rotate therewith, a circular series of cutting knives carried by the rotating part, a plurality of circumferentially spaced ledger-plates equipped guard fingers carried by the fixed part of the divider and with which the knives are cooperable for cutting purposes, and a driving connection between said reel and said pin for rotating the rotatable part of the divider.

3. The combination as set forth in claim 2 and wherein the fixed part of the divider is provided with a guard shoe extending circumferentially thereof at its lower edge and disposed in a protective position relative to the knives.

4. In a harvesting machine, and in combination, a sickle, a reel, and a divider attachment disposed at one end of the sickle and reel and including vertical juxta-positioned parts, a bracket pivoted to one part and secured to a fixed part of the sickle at one end of the latter, a suspension link depending from the machine and pivoted at one end to said one part for cooperation with the bracket in securing the divider at the desired elevation relative to the ground, an axial pin rotatably supported by the one part of the divider and extending centrally therethrough, a rotatable part on one end of the pin, a series of mower guard fingers carried by the one part and extending radially therefrom, a continuous series of mower knives carried by the rotating part and extending radially therefrom for movement across the guard fingers, and a driving connection between said pin and the reel; a guard shoe mounted on the lower portion of the one part of the divider and extending therefrom in a protective position relative to said knives, and a grain slide mounted at the inner side of the divider adjacent the lower portion thereof.

5. A divider assembly for harvesting machines comprising a pair of disks one of which is of greater diameter than the other and is also provided with a centrally located hub, bearings mounted in the hub, a pin extending centrally through the hub and journalled in the bearings, the disk of smaller diameter being secured on one end of the pin and a driven element being secured on the end of the pin opposite to the last named disk, the first named disk being provided in its periphery with a circumferential notch, a pair of guard fingers having shanks secured to the first named disk in the region of the notch and a circular series of knives carried by the disk of small diameter and movable therewith across the guard fingers upon rotation of the disk of small diameter relative to the disk of larger diameter.

6. A divider assembly for harvesting machines comprising a pair of disks one of which is of greater diameter than the other and is also provided with a centrally located hub, bearings mounted in the hub, a pin extending centrally through the hub and journalled in the bearings, the disk of smaller diameter being secured on one end of the pin and a driven element being secured on the end of the pin opposite to the last named disk, the first named disk being provided in its periphery with a circumferential notch, a pair of guard fingers having shanks secured to the first named disk in the region of the notch and a circular series of knives carried by the disk of small diameter and movable therewith across the guard fingers upon rotation of the disk of small diameter relative to the disk of larger diameter, a curved shoe mounted on the first disk at the periphery thereof, and a ledger plate mounted on the shoe and with which said knives are cooperable for cutting purposes.

JOHN WILLIAM McCLURE.
SAMUEL B. McCLURE.